United States Patent

Choi

[11] Patent Number: 6,111,879
[45] Date of Patent: Aug. 29, 2000

[54] TELEPHONE SERVICE SYSTEM IN A ASYNCHRONOUS TRANSFER MODE PRIVATE NETWORK

[75] Inventor: Yong-Shik Choi, Seoul, Rep. of Korea

[73] Assignee: Hyundai Electronics Ind. Co., Ltd., Kyoungki-do, Rep. of Korea

[21] Appl. No.: 08/976,787

[22] Filed: Nov. 24, 1997

[30] Foreign Application Priority Data

Nov. 30, 1996 [KR] Rep. of Korea ................ 96-60255

[51] Int. Cl.[7] .................... G01R 31/08; H04L 12/28; H04J 15/00
[52] U.S. Cl. .................... 370/395; 370/242; 370/397; 370/401; 370/464
[58] Field of Search .................... 370/395, 396, 370/399, 401, 466, 464, 465, 467, 397, 242, 241, 244, 245, 352, 354, 219, 220, 221

[56] References Cited

U.S. PATENT DOCUMENTS

| | | |
|---|---|---|
| 5,060,227 | 10/1991 | Finley et al. .................... 370/79 |
| 5,459,722 | 10/1995 | Sherif . | |
| 5,548,589 | 8/1996 | Jeon et al. . | |
| 5,757,775 | 5/1998 | Yokoyama et al. .................... 370/242 |
| 5,828,651 | 10/1998 | Jang et al. .................... 370/219 |
| 5,892,764 | 4/1999 | Riemann et al. .................... 370/401 |
| 5,930,250 | 7/1999 | Klok et al. .................... 370/352 |
| 5,963,555 | 10/1999 | Takase et al. .................... 370/395 |

*Primary Examiner*—Huy D. Vu
*Assistant Examiner*—M. Phan
*Attorney, Agent, or Firm*—Lawrence G. Kurland; Bryan Cave LLP

[57] ABSTRACT

A telephone service system in an ATM private network, includes: a PSTN interface unit for performing PCM with an analog telephone signal transmitted from a channel in a PSTN, converting the modulated data into a CEPT frame before sending it to a subscriber, performing the PCM with CEPT frame data, from a subscriber, and converting the modulated data into an analog telephone signal, before forwarding it to the PSTN; a first ATM cell processing unit for converting the CEPT frame data from the PSTN interface unit into an ATM cell, converting an ATM cell from a subscriber into CEPT frame data, and sending it to the PSTN interface unit; an ATM switching unit for switching the ATM cell from the first ATM processing unit to the subscriber, and switching the ATM cell from the subscriber to the PSTN; a second ATM processing unit for converting the ATM cell from the ATM switching unit into CEPT frame data before sending it to the subscriber, and converting the CEPT frame data from the subscriber into an ATM cell before sending it to the ATM switching unit; and a subscriber line interface unit for converting the CEPT frame data from the second ATM processing unit into an analog telephone signal before sending it to a relevant subscriber, performing the PCM with the analog telephone signal from the subscriber, and converting the PCM data into CEPT frame data.

7 Claims, 3 Drawing Sheets

TELEPHONE SERVICE SYSTEM IN A ASYNCHRONOUS TRANSFER MODE PRIVATE NETWORK

BACKGROUND OF THE INVENTION

1. Field of the Invention

The present invention relates to an asynchronous transfer mode (ATM) private network. Specifically, this invention is a telephone service system in ATM which implements telephone service in the ATM by converting an analog telephone signal, which are input/output to/by a switch in a public switched telephone network (PSTN), into an ATM cell.

2. Discussion of Related Art

Wide-band integrated services digital network (ISDN) is a communications network which integrally provides telephone service, video telephone, data transmission, and facsimile. In the ATM, the units of data having a fixed length, called cells, are transferred and switched, thus the ATM is appropriate for the wide-band ISDN. The ATM method is not used in all areas, so ATM networks, which may be need to be connected to each other. U.S. Pat. No. 5,459,722 relates to an interface device for connecting ATM networks, which are far away from each other, using an existing PSTN.

A digital trunk transmission method used in the PSTN for a usual telephone service employs a time division multiplexing (TDM) system. In the TDM system, time slots, which are repeated with predetermined intervals, are allocated to corresponding subscribers. Information is loaded into the slots and transmitted. The multiplexed information is discriminated by the position of the slot in the temporal domain. If the information transmission speed changes, a slot which is capable of covering the maximum speed of the information is required, so a subscriber is allocated a time slot, regardless of the existence of data to be transmitted. Consequently, the average transmission speed of information is very low, and the transmission lines are not used efficiently.

A conventional method for a telephone service exchanges subscribers' telephone signals through a switch and PSTN to provide the signals to subscribers. A digital trunk transmission method for the conventional telephone service always allocates time slots to each subscriber, regardless of the existence of data to be transmitted, thus overall transmission bandwidth becomes large. For implementing multimedia service, enormous transmission bandwidth is required to accommodate the services subscribed by users. To solve this problem, an ATM method is presented. However, the existing PSTN cannot perform high speed transmission because of high loss, so the PSTN cannot be correlatively linked with the ATM method.

SUMMARY OF THE INVENTION

Accordingly, the present invention is directed to a telephone service system in an ATM private network that substantially obviates one or more of the limitations and disadvantages of the related art.

An object of the present invention is to provide a telephone service system which can provide an analog telephone service in the ATM private network by converting an analog telephone signal transmitted by a PSTN into an ATM cell.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a telephone service system in an ATM private network, includes: a PSTN interface unit for performing PCM with an analog telephone signal transmitted from a channel in a PSTN, converting the modulated data into a CEPT frame before sending it to a subscriber, performing the PCM with CEPT frame data from a subscriber, and converting the modulated data into an analog telephone signal, before forwarding it to the PSTN; a first ATM cell processing unit for converting the CEPT frame data from the PSTN interface unit into an ATM cell, converting an ATM cell from a subscriber into CEPT frame data, and sending it to the PSTN interface unit; an ATM switching unit for switching the ATM cell from the first ATM processing unit to the subscriber, and switching the ATM cell from the subscriber to the PSTN; a second ATM processing unit for converting the ATM cell from the ATM switching unit into CEPT frame data before sending it to the subscriber, and converting the CEPT frame data from the subscriber into an ATM cell before sending it to the ATM switching unit; and a subscriber line interface unit for converting the CEPT frame data from the second ATM processing unit into an analog telephone signal before sending it to a relevant subscriber, and performing the PCM with the analog telephone signal from the subscriber and converting the PCM data into CEPT frame data.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

The operations and effects of the present invention are described below in detail with a preferred embodiment according to the technological idea of the present invention.

Figure 1:
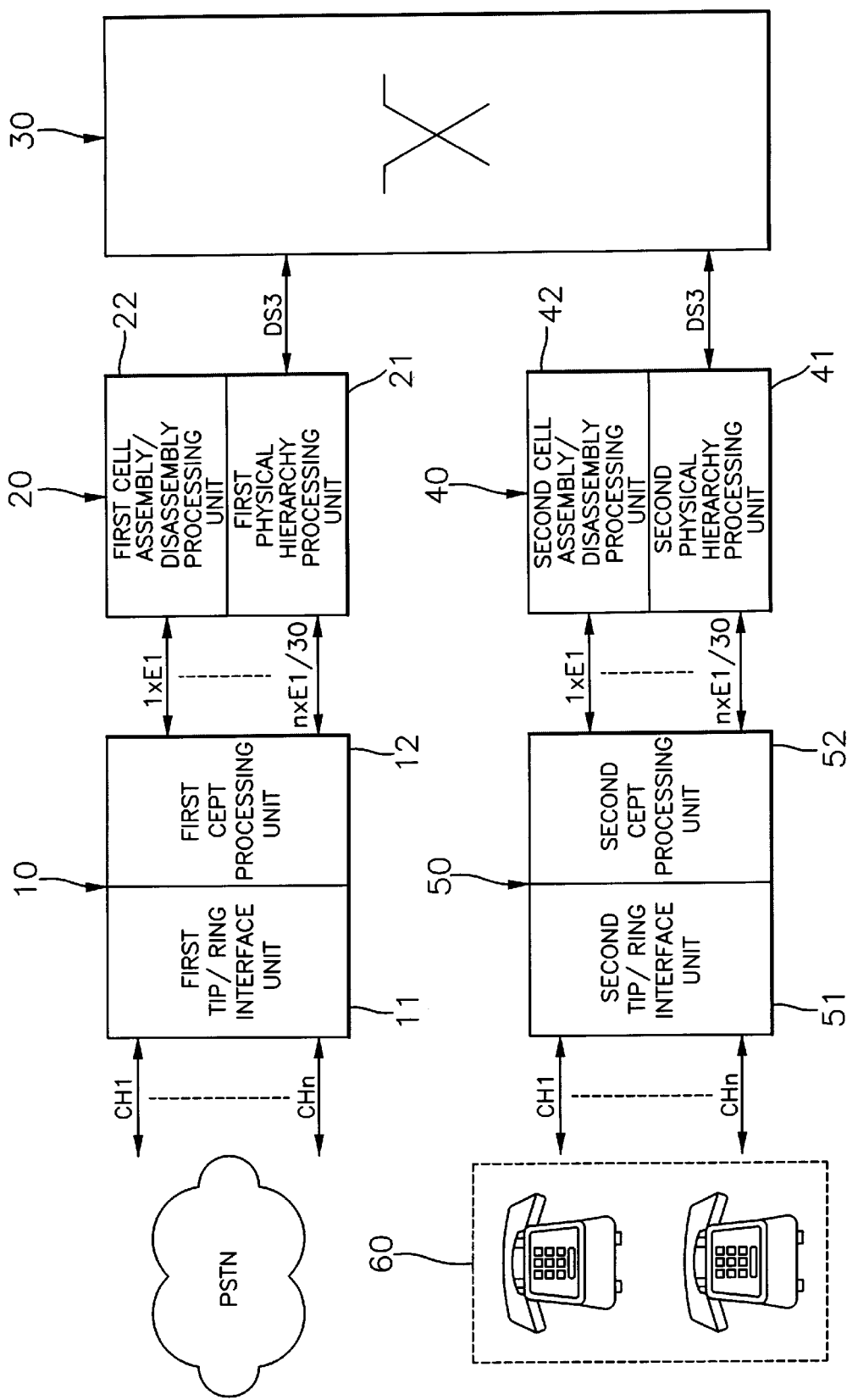
FIG. 1 is a block diagram of a telephone service system in an ATM private network, according to the present invention.

As shown in FIG. 1, PSTN interface unit 10 consists of first tip/ring interface unit 11 and first CEPT processing unit 12. First tip/ring interface unit 11 performs a pulse code modulation (PCM) with analog telephone signals of each channel (CH1–CHn) transmitted from a PSTN switch, and converts PCM data from subscribers into analog telephone signals. First CEPT processing unit 12 converts the PCM data, transmitted from first tip/ring interface unit 11 through thirty channels into one CEPT frame, and outputs the frame through n/30 E1 channels. First CEPT processing unit 12 also performs the reverse operation.

First ATM processing unit 20 consists of first cell assembly/disassembly processing unit 22 and first physical hierarchy processing unit 21. First cell assembly/disassembly processing unit 22 converts the CEPT frame signal, transmitted from first CEPT processing unit 12, into an ATM cell, before sending it to first physical hierarchy processing unit 21. First cell assembly/disassembly processing unit 22 further converts the ATM cell, transmitted from ATM switching unit 30, into a CEPT frame, before sending it to first CEPT processing unit 12. First physical hierarchy processing unit 21 transmits the ATM cell from first cell assembly/disassembly processing unit 22 to ATM switching unit 30, and transmits the ATM cell from ATM switching unit 30 to first cell assembly/disassembly processing unit 22.

ATM switching unit 30 switches the ATM cell transmitted from first ATM processing unit 20 to a subscriber, and switches the ATM cell received from the subscriber (or second ATM processing unit 40) to the PSTN.

Second ATM processing unit 40 consists of second cell assembly/disassembly processing unit 42 and second physical hierarchy processing unit 41. Second cell assembly/disassembly processing unit 42 converts the ATM cell, transmitted from ATM switching unit 30, into a CEPT frame, before sending it to second CEPT processing unit 52. Second cell assembly/disassembly processing unit 12 further and converts the CEPT frame signal, transmitted from second CEPT processing unit 52, into an ATM cell, before sending it to ATM switching unit 30 through second physical hierarchy processing unit 41. Second physical hierarchy processing unit 41 transmits the ATM cell from second cell assembly/disassembly processing unit 42 to ATM switching unit 30, and transmits the ATM cell from ATM switching unit 30 to second cell assembly/disassembly processing unit 42.

Subscriber interface unit 50 consists of second tip/ring interface unit 51 and second CEPT processing unit 52. Second tip/ring interface unit 51 performs the PCM with analog telephone signals of each channel (CH1–CHn) transmitted from a subscriber 60, and converts PCM data, from the PSTN switch, into an analog telephone signal, before sending it to the subscriber 60. Second CEPT processing unit 52 converts the PCM data, transmitted from second tip/ring interface unit 51 through thirty channels, into one CEPT frame, and outputs the frame through n/30 E1 channels.

Figure 2:
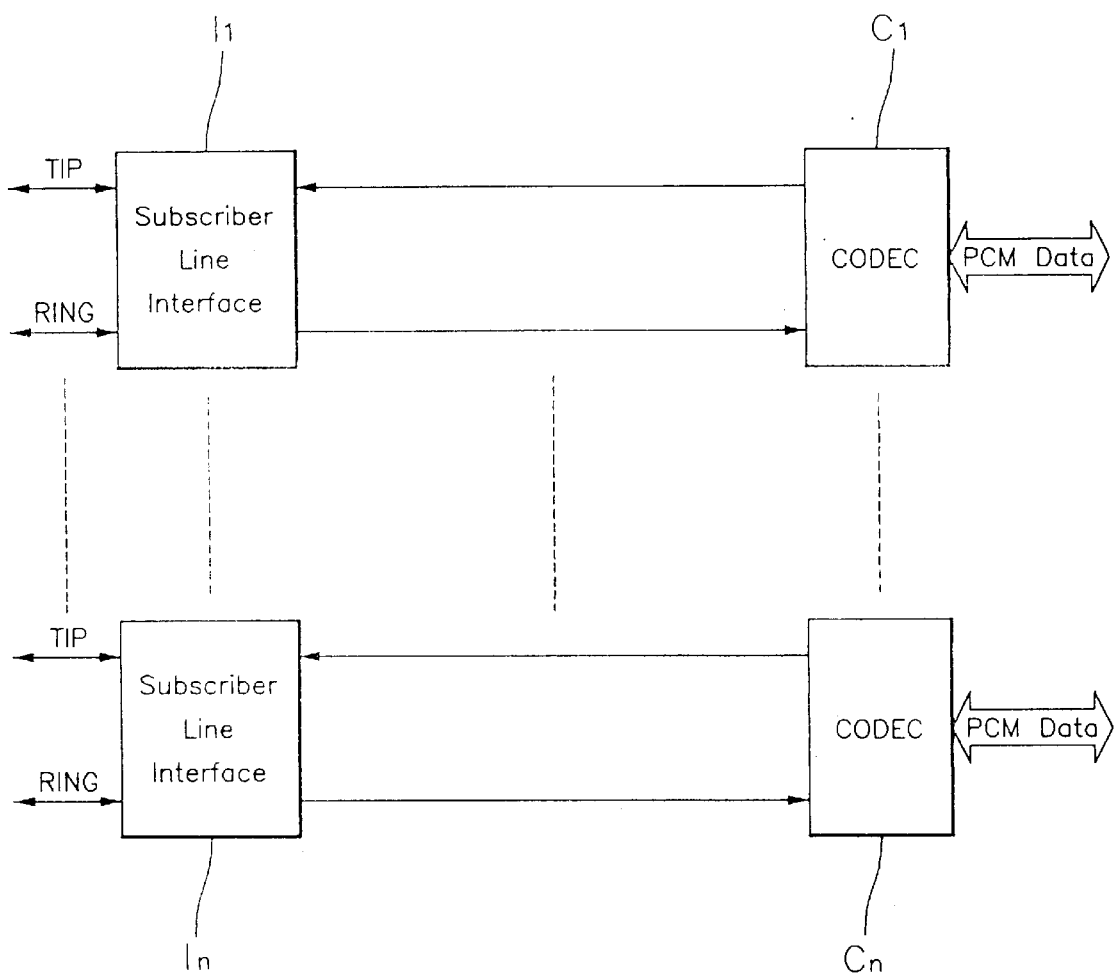
FIG. 2 is a block diagram of the tip/ring interface unit of the present invention.

As shown in FIG. 2, tip/ring interface unit 11 consists of n subscriber line interfaces ($I_1$–$I_n$), for transmitting analog telephone signals received from n channels in the PSTN to subscribers, and transmitting analog signals from subscribers (or, CODECs ($C_1$–$C_n$)) to the PSTN; and n CODECs ($C_1$–$C_n$), for converting analog telephone signals, from the n subscriber line interfaces ($I_1$–$I_n$), into PCM data, before sending them to subscribers, and converting PCM data, from the subscribers (or, first CEPT processing unit 12), into analog signals, before sending it to the subscriber line interfaces ($I_1$–$I_n$).

Analog signals are transmitted from a PSTN switch to subscriber line interfaces ($I_1$–$I_n$) through n channels consisting of a pair of tip and ring wires. The subscriber line interfaces ($I_1$–$I_n$) convert telephone signals, superimposed over −48V DC, into voltage signals between −1V and +1V, before sending them to subscribers (or, CODECs ($C_1$–$C_n$)), and superimposes the voltage signals between −1V and +1V over −48V DC, before sending them to the PSTN. The voltage signals between −1V and +1V, transmitted from the subscriber line interfaces ($I_1$–$I_n$), are input to CODECs ($C_1$–$C_n$), where the signals are sampled at the speed of 8 KHz and converted to 8-bit PCM data, and then sent to the subscribers. The speed of data, which is output through one channel of the CODECs ($C_1$–$C_n$), is 8×8 Kbps. PCM data transmitted from subscribers to CODECs ($C_1$–$C_n$) is converted into analog signals, before being sent to the switch in the PSTN.

Figure 3:
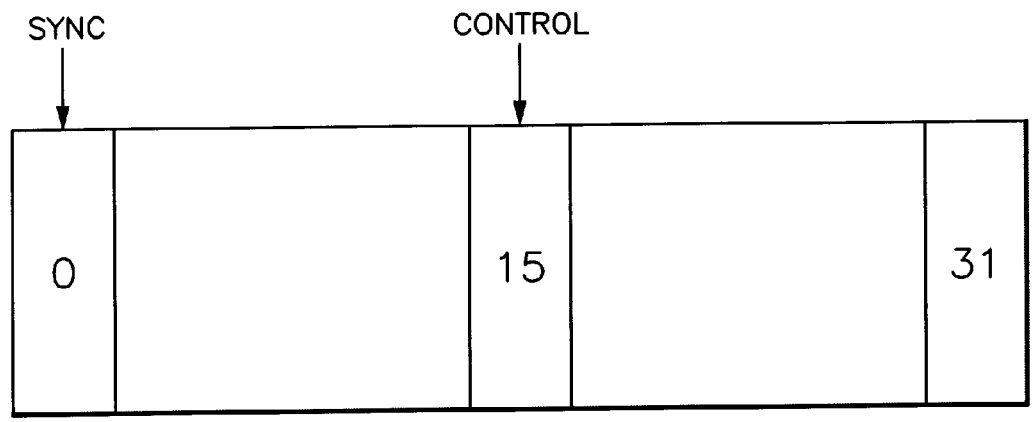
FIG. 3 shows the configuration of an E1 frame.

PCM data from the CODECs ($C_1$–$C_n$) are sent to first CEPT processing unit 12, where the PCM data is converted into an E1 frame, and then sent to first ATM processing unit 20. The structure of the E1 frame is shown in FIG. 3. One channel consists of 8 bits, and its speed is 8 Kbps. The first channel is for synchronization, and the fifteenth and thirty second channels are for control. Since the E1 frame consists of 32 channels, its speed is 32×8×8 Kbps=2.048 Mbps. First CEPT processing unit 12 receives telephone signals of n channels from the PSTN switch and outputs the signals through n/30 E1 frame channels. First CEPT processing unit 12 receives E1 frame data and converts it into PCM data, before sending it into the CODECs ($C_1$–$C_n$) in first tip/ring interface unit 10.

Figure 4:
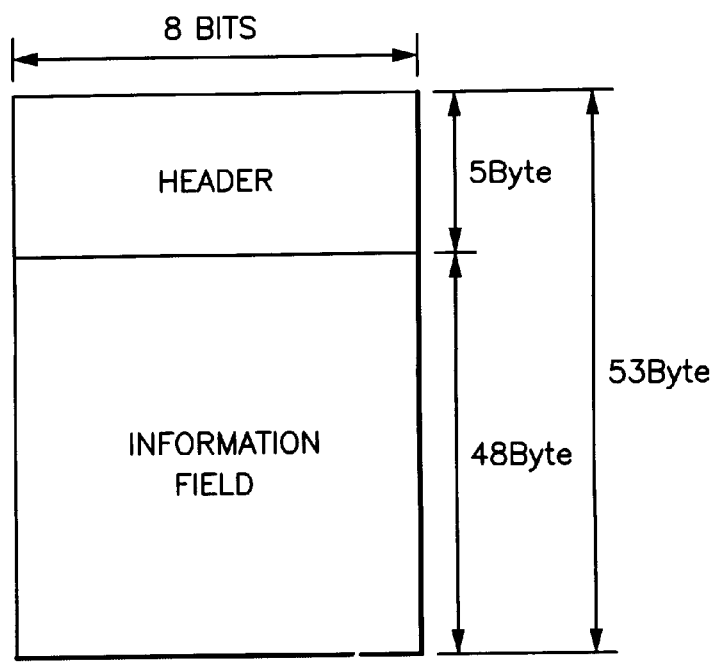
FIG. 4 shows the configuration of an ATM cell.

The E1 frame data from first CEPT processing unit 12 is sent to first cell assembly/disassembly processing unit 22 through first physical hierarchy processing unit 21 in first ATM processing unit 20. First cell assembly/disassembly processing unit 22 disassembles E1 frame data into ATM cells. FIG. 4 shows the structure of the ATM cell. The ATM cell consists of a 5-byte cell header and a 48-byte information field. First cell assembly/disassembly processing unit 22 forms a 48-byte information field from the E1 frame data, and creates a cell header, thus constructing a complete ATM cell. The ATM cell is sent to ATM switching unit 30 through first physical hierarchy processing unit 21 at a digital signal speed, DS3 (44.736 Mbps employed in the T3 leased line used in North America). First cell assembly/disassembly processing unit 22 disassembles and converts the ATM cell, transmitted from ATM switching unit 30, into E1 frame data, before sending it to first CEPT processing unit 12 through first physical hierarchy processing unit 21.

ATM switching unit 30 receives an ATM cell from the PSTN and selects a path based upon a virtual path identifier (VPI) and a virtual channel identifier (VCI) contained by a cell header to send the cell to a subscriber. ATM switching unit 30 performs the same process with an ATM cell from a subscriber to send the cell to the PSTN. The ATM cell, which is transmitted from ATM switching unit 30 to a subscriber at the speed of DS3, is sent to second cell assembly/disassembly processing unit 42 through second physical hierarchy processing unit 41 in second ATM processing unit 40. The ATM cell, which is transmitted from the PSTN, is sent to first cell assembly/disassembly processing unit 22 through first physical hierarchy processing unit 21 in first ATM processing unit 20.

Second cell assembly/disassembly processing unit 42 disassembles and converts an ATM cell, from ATM switching unit 30, into E1 frame data and sends it to second CEPT processing unit 52 in subscriber interface unit 50 through second physical hierarchy processing unit 41. Second cell assembly/disassembly processing unit 42 assembles E1 frame data, transmitted from second CEPT processing unit 52 at the speed of 2.048 Mbps, to make an ATM cell, and sends the cell to ATM switching unit 30 through second physical hierarchy processing unit 41 in the form of a DS3 digital signal.

Second CEPT processing unit 52 converts the E1 frame data of n/30 channels into PCM data of n channels and sends it to the CODECs in second tip/ring interface unit 51. Reversely, second CEPT processing unit 52 converts the PCM data, from the CODECs in second tip/ring interface unit 51, into E1 frame data and sends it to second ATM processing unit 40.

Second tip/ring interface unit 51 has the same configuration as first tip/ring interface unit 11, as shown in FIG. 2. Second tip/ring interface unit 51 consists of n subscriber line interfaces ($I_1$–$I_n$), for transmitting analog telephone signals from n subscriber telephone channels to the PSTN, and transmitting analog signals from the PSTN (or, CODECs ($C_1$–$C_n$)) to subscriber telephones 60; and n CODECs ($C_1$–$C_n$), for converting analog telephone signals, from the n subscriber line interfaces ($I_1$–$I_n$), into PCM data, before sending them to the PSTN (or, second CEPT processing unit 52), and converting PCM data, from the PSTN, into analog signals, before sending it to the subscriber line interfaces ($I_1$–$I_n$).

The CODECs ($C_1$–$C_n$) in second tip/ring interface unit 51 convert the PCM data, transmitted from second CEPT processing unit 52, into analog signals, and send them to corresponding subscriber line interfaces ($I_1$–$I_n$). For example, the first CODEC ($C_1$) sends a signal to the first subscriber line interface ($I_1$), and the nth CODEC ($C_n$) sends a signal to the nth subscriber line interface ($I_n$). Reversely, the CODECs ($C_1$–$C_n$) in second tip/ring interface unit 51 convert the analog signals, transmitted from the subscriber line interfaces ($I_1$–$I_n$), into PCM data and send it to second CEPT processing unit 52. The subscriber line interfaces ($I_1$–$I_n$) which received the telephone signals from CODECs ($C_1$–$C_n$) forward the telephone signals to corresponding subscriber telephones 60.

As described above, this invention converts analog telephone signals transmitted from PSTN into ATM cells, thus making it possible to provide analog telephone service in an ATM private network. Therefore, this invention increases the usability of a transmission line by reducing time slots which are not in use.

It will be apparent to those skilled in the art that various modifications and variations can be made in a telephone service system in an ATM private network of the present invention without deviating from the spirit or scope of the invention. Thus, it is intended that the present invention cover the modifications and variations of this invention provided they come within the scope of the appended claims and their equivalents.

What is claimed is:

1. A telephone service system for use in an asynchronous transfer mode (ATM) private network comprising:

a public switched telephone network (PSTN) interface unit for performing pulse code modulation (PCM) with an analog telephone signal transmitted from a channel in a PSTN and converting the modulated data into a Conference of European Postal And Telecommunications Administrations (CEPT) frame before sending it to a subscriber, said PSTN interface unit performing the PCM with CEPT frame data received from a subscriber and converting the modulated data into an analog telephone signal before forwarding it to the PSTN;

a first ATM cell processing unit for converting the CEPT frame data from the PSTN interface unit into an ATM cell and converting an ATM cell received from a subscriber into CEPT frame data before transmitting it to the PSTN interface unit;

an ATM switching unit for switching the ATM cell received from the first ATM processing unit to the subscriber and switching the ATM cell received from the subscriber to the PSTN;

a second ATM processing unit for converting the ATM cell received from the ATM switching unit into CEPT frame data before sending it to the subscriber, said second ATM processing unit converting the CEPT frame data received from the subscriber into an ATM cell before sending it to the ATM switching unit; and a subscriber line interface unit for converting the CEPT frame data received from the second ATM processing unit, into an analog telephone signal before sending it to a relevant subscriber, said subscriber line interface unit performing the PCM with the analog telephone signal received from the subscriber and converting the PCM data into CEPT frame data;

said PSTN interface unit comprising a first tip/ring interface unit for performing the PCM with analog telephone signals of n channels transmitted from the PSTN switch before sending it to a subscriber, said first tip/ring interface unit converting PCM data received from a subscriber, into an analog telephone signal and first CEPT processing unit for converting the PCM data of 30 channels transmitted from the first tip/ring interface unit into one CEPT frame before outputting said PCM data through n/30 E1 channels, said CEPT processing unit receiving a CEPT frame through n/30 E1 channels and converting said CEPT frame into PCM data before transmitting it to said first tip/ring interface unit.

2. A telephone service system for use in an asynchronous transfer mode (ATM) private network, comprising:

a public switched telephone network (PSTN) interface unit for performing pulse code modulation (PCM) with an analog telephone signal transmitted from a channel in a PSTN and converting the modulated data into a Conference of European Postal And Telecommunications Administrations (CEPT) frame before sending it to a subscriber, said PSTN interface unit performing the PCM with CEPT frame data received from a subscriber and converting the modulated data into an analog telephone signal before forwarding it to the PSTN;

a first ATM cell processing unit for converting the CEPT frame data from the PSTN interface unit into an ATM cell and converting an ATM cell received from a subscriber into CEPT frame data before transmitting it to the PSTN interface unit;

an ATM switching unit for switching the ATM cell received from the first ATM processing unit to the subscriber and switching the ATM cell received from the subscriber to the PSTN;

a second ATM processing unit for converting the ATM cell received from the ATM switching unit into CEPT frame data before sending it to the subscriber, said second ATM processing unit converting the CEPT frame data received from the subscriber into an ATM cell before sending it to the ATM switching unit; and a subscriber line interface unit for converting the CEPT frame data received from the second ATM processing unit, into an analog telephone signal before sending it to a relevant subscriber, said subscriber line interface unit performing the PCM with the analog telephone signal received from the subscriber and converting the PCM data into CEPT frame data;

said subscriber interface unit comprising a second tip/ring interface unit for performing the PCM with analog telephone signals of multiple channels transmitted from subscribers and converting PCM data from the PSTN into analog telephone signals before sending it to a relevant subscriber, and a second CEPT processing unit for converting the PCM data of 30 channels from said second tip/ring interface unit into one CEPT frame before outputting it through n/30 E1 channels, and converting a CEPT frame received from subscribers into PCM data of 30 channels.

3. The system according to claim 1, wherein the first tip/ring interface unit comprises:

multiple subscriber line interfaces for transmitting analog telephone signals from channels in the PSTN to subscribers and forwarding the analog signals from the subscribers to the PSTN; and multiple CODECs for performing the PCM with analog telephone signals received from the subscriber line interfaces before sending them to subscribers, converting PCM data of multiple channels received from the subscribers into analog signals, and sending them to corresponding subscriber line interfaces.

4. The device according to claim 1, wherein the first CEPT processing unit converts telephone signals of n channels, from the PSTN switch, into n/30 E1 frame channels and converts E1 frame data, from subscribers, into PCM data, before sending it to the first tip/ring interface unit.

5. The device according to claim 2, wherein the second tip/ring interface unit comprises:

multiple subscriber line interfaces for transmitting analog telephone signals from subscriber telephone channels to the PSTN, and transmitting the analog signals from the PSTN to the subscriber telephones; and multiple CODECs for performing the PCM with analog telephone signals transmitted from the subscriber line interfaces before sending them to the PSTN, and converting PCM data from the PSTN into analog signals before sending it to the subscriber line interfaces.

6. The system according to claim 3, wherein the CODEC comprising means for sampling an analog signal from the subscriber line interface at the speed of 8 KHz, converting it into 8-bit PCM data before sending it to a subscriber, and converting PCM data received from a subscriber into an analog signal before sending it to the PSTN switch.

7. A telephone service system in an asynchronous transfer mode (ATM) private network, comprising:

a first tip/ring interface unit for performing Pulse Code Modulation (PCM) with analog telephone signals of n channels transmitted from a Public Switched Telephone Network (PSTN) switch before sending them to a subscriber, and converting PCM data received from a subscriber into an analog telephone signal;

a first CEPT processing unit for converting the PCM data of 30 channels transmitted from the first tip/ring interface unit, into one CEPT frame before outputting it through n/30 E1 channels, said CEPT processing unit receiving a CEPT frame through n/30 channels and converting said CEPT frame into PCM data before transmitting it to said first tip/ring interface unit;

a first cell assembly/disassembly processing unit for converting the CEPT frame signal received from the first CEPT processing unit into an ATM cell and converting the ATM cell received from the ATM switching unit into a CEPT frame before sending it to the first CEPT processing unit;

a first physical hierarchy processing unit for transmitting the ATM cell received from the first cell assembly/disassembly processing unit into an ATM switching unit, and for transmitting the ATM cell received from the ATM switching unit to the first cell assembly/disassembly processing unit;

an ATM switching unit for receiving an ATM cell from a first ATM cell processing unit, selecting a path with reference to a virtual path identifier and a virtual channel identifier contained in a cell header, before sending the cell to a subscriber, and sending an ATM cell transmitted from a subscriber to a PSTN;

a second cell assembly/disassembly processing unit for converting an ATM cell received from the ATM switching unit into a CEPT frame before sending it to a subscriber, and for converting a CEPT frame signal from the subscriber into an ATM cell before sending it to the ATM switching unit;

a second physical hierarchy processing unit for transmitting the ATM cell from the second cell assembly/disassembly processing unit to the ATM switching unit, said second physical hierarchy processing unit receiving an ATM cell from the ATM switching unit and transmitting it to the second cell assembly/disassembly processing unit;

a second tip/ring interface unit for performing the PCM with analog telephone signals of multiple channels transmitted from subscribers, and for converting PCM data received from the PSTN into analog telephone signals before sending it to a relevant subscriber; and a second CEPT processing unit for converting the PCM data of 30 channels received from second tip/ring interface unit into one CEPT frame before outputting the frame through n/30 E1 channels, and for converting a CEPT frame received from subscribers into PCM data of 30 channels.

* * * * *